United States Patent [19]

Müller et al.

[11] Patent Number: 5,696,205
[45] Date of Patent: Dec. 9, 1997

[54] PROCESS FOR PREPARING TPU MOLDING COMPOSITIONS

[75] Inventors: Friedemann Müller, Neuss; Wolfgang Bräuer, Leverkusen; Hans-Georg Hoppe, Leichlingen; Hans-Georg Wussow, Düsseldorf; Herbert Heidingsfeld, Frechen; Willi Meister, Dormagen; Bernhard Schulte, Krefeld; Jürgen Winkler, Langenfeld, all of Germany

[73] Assignee: Bayer Aktiengesellschaft, Leverkusen, Germany

[21] Appl. No.: 629,983

[22] Filed: Apr. 8, 1996

[30] Foreign Application Priority Data

Apr. 10, 1995 [DE] Germany .................. 195 13 501.6

[51] Int. Cl.$^6$ ............................................. C08G 18/04
[52] U.S. Cl. .................. 525/77; 525/77; 525/79; 525/82; 525/131
[58] Field of Search ...................... 525/131, 77, 82, 525/79

[56] References Cited

U.S. PATENT DOCUMENTS

| | | | |
|---|---|---|---|
| 4,179,479 | 12/1979 | Carter, Jr. ...................... | 525/66 |
| 4,317,890 | 3/1982 | Goyert et al. .................. | 525/66 |
| 4,342,847 | 8/1982 | Goyert et al. .................. | 525/66 |
| 4,452,737 | 6/1984 | Schmidt et al. ................ | 260/192 |
| 4,476,053 | 10/1984 | Schmidt et al. ................ | 260/192 |
| 5,260,375 | 11/1993 | Lausberg et al. ............... | 525/66 |
| 5,455,312 | 10/1995 | Heidingsfeld et al. .......... | 525/457 |

FOREIGN PATENT DOCUMENTS

| | | |
|---|---|---|
| 1231488 | 1/1988 | Canada . |
| 2021600 | 12/1979 | United Kingdom . |

OTHER PUBLICATIONS

Kunststoffe [Plastics] 68 (1978) (Month unavailable), pp. 819 to 825—English Translation also attached.—Goyert & Hespe; Thermoplastic PU Elastomers.

Kautschuk, Gummi, Kunststoffe [Natural and Vulcanised Rubber and Plastics] 35 (1982), (Month available) pp. 568 to 584. Timm; Properties of PU Elastomers.

*Primary Examiner*—Rachel Gorr
*Attorney, Agent, or Firm*—Joseph C. Gil; Aron Preis

[57] ABSTRACT

A process for the continuous production of a thermoplastic molding composition containing a mixture of TPU and a (co)polymer is disclosed. The process comprises (a) introducing into an extruder under time and temperature conditions sufficient to bring about the formation of thermoplastic polyurethane a (co)polymer, and polyurethane-forming components comprising A) an organic diisocyanate, B) a linear polyol having terminal hydroxyl groups and a molecular weight of 500 to 5000, and C) a chain extender having a molecular weight of 60 to 500, and upon completing the formation of said polyurethane (b) discharging the resulting TPU/(co)polymer mixture from the extruder. Importantly, the (co)polymer contains a flow enhancer and the molar ratio of the NCO groups in A) to the groups which react with NCO in B) and C) is 0.9 to 1.2.

4 Claims, No Drawings

PROCESS FOR PREPARING TPU MOLDING COMPOSITIONS

FIELD OF THE INVENTION

This invention relates to thermoplastic molding compositions which contain thermoplastic polyurethane and more particularly to a process for their preparation.

TECHNOLOGICAL BACKGROUND OF THE INVENTION

Thermoplastic polyurethane elastomers (TPUs) have long been known. They are of commercial importance due to their good mechanical properties and their thermoplastic processability. Their mechanical properties can be varied within wide limits by a suitable choice of components. A review of TPUs, their properties and applications is given in Kunststoffe [*Plastics*] 68 (1978), pages 819 to 825, and in Kautschuk, Gummi, Kunststoffe [*Natural and Vulcanised Rubber and Plastics*] 35 (1982), pages 568 to 584.

TPUs are synthesized from linear polyols, mainly polyester or polyether diols, organic diisocyanates and short chain diols (chain extenders). Catalysts may be added to the reaction to speed up the reaction of the components.

The relative amounts of the components may be varied over a wide range of molar ratios in order to adjust the properties. Molar ratios of polyols to chain extenders from 1:1 to 1:12 have been reported. These result in products with hardness values ranging from 80 Shore A to 75 Shore D.

TPUs can either be produced in stages (prepolymer method) or by the simultaneous reaction of all the components in one step (one shot). In the former, a prepolymer formed from the polyol and diisocyanate is first formed and then reacted with the chain extender.

TPUs may be produced continuously or batch-wise. The best-known industrial production processes are the so-called belt process and the extruder process.

By mixing them with other polymers, the favorable properties of TPUs can be modified. In particular, the admixture of graft rubbers improves the low temperature properties of TPUs. A TPU/ABS mixture is described in U.S. Pat. No. 4,317,890. The molding compositions obtained, however, exhibit unsatisfactory impact strength at low temperatures and are not free from segregation phenomena, the so-called "mother of pearl" effect. The use of TPUs of low density (EP-A 0,152,049) or the addition of auxiliary processing agents (polyacrylates in U.S. Pat. No. 4,179,479, styrene-MSA copolymers in EP-A 0,443,432) does not impart a significant improvement to the compositions, which are characterized, in particular, by their modest low-temperature impact-strength.

TPU/polymer mixtures are said, in DE-OS 2,854,409 (U.S. Pat. No. 4,342,847) to have been produced in an extruder reaction process by adding all the TPU raw materials to the pre-produced polymer, which has previously been melted in the extruder. The compositions containing mixtures produced in this manner have a low-temperature impact-strength which is improved, but which is still unsatisfactory. Other disadvantages include the high melting temperatures and the pronounced temperature-dependence of the melt viscosity.

No success has hitherto been achieved in obtaining TPU/(co)-polymer mixtures which exhibit good mechanical and elastic properties, particularly at low temperatures, and which at the same time exhibit good melting behavior.

DETAILED DESCRIPTION OF THE INVENTION

The present invention relates to a process for the continuous production of a thermoplastic molding composition containing a mixture of TPU and a (co)polymer. The process comprises (a) introducing into an extruder under time and temperature conditions sufficient to bring about the formation of thermoplastic polyurethane I) 1 to 60%, with respect to the total weight of (I) and (II), of a (co)polymer, and II) 99 to 40%, with respect to the total weight of (I) and (II), of a polyurethane-forming components comprising A) an organic diisocyanate B) a linear polyol having terminal hydroxyl groups and a number average molecular weight of 500 to 5000, and C) a chain extender having a molecular weight of 60 to 500, wherein (I) contains 1 to 30%, relative to its weight, of a flow enhancer and where the molar ratio of the NCO groups in A) to the groups which react with NCO in B) and C) is 0.9 to 1.2, and upon completing the formation of said polyurethane (b) discharging the resulting TPU/(co)polymer mixture from the extruder.

The introduction of (I) and (II) into the extruder may be carried out individually or in admixture, via one or more feed points of the extruder. Further, component C) above may optionally contain at least one triol.

The TPU/(co)polymer mixture prepared according to the invention thus contains thermoplastically processable polyurethanes which are synthesized from organic diisocyanates A), polyols B) and chain extenders C).

Examples of suitable organic diisocyanates include aliphatic, cycloaliphatic, araliphatic, heterocyclic and aromatic diisocyanates. Such diisocyanates are well known and include those which are described in Justus Liebigs Annalen der Chemie, 562, pages 75 to 136, for example.

The following are examples of suitable diisocyanates: aliphatic diisocyanates such as hexamethylene diisocyanate, cycloaliphatic diisocyanates such as isophorone diisocyanate, 1,4-cyclohexane diisocyanate, 1-methyl-2,4- and -2,6-cyclohexane diisocyanate and the corresponding mixtures of isomers, 4,4'-, 2,4'- and 2,2'-dicyclohexylmethane diisocyanate and the corresponding mixtures of isomers, and aromatic diisocyanates such as toluene 2,4-diisocyanate, mixtures of toluene 2,4- and 2,6-diisocyanates, 4,4', 2,4'- and 2,2'-diphenylmethane diisocyanates, mixtures of 2,4'- and 4,4'-diphenylmethane diisocyanates, urethane-modified, liquid 4,4'- and/or 2,4'-diphenylmethane diisocyanates, 4,4'-diisocyanatodiphenylethane-(1,2) and naphthalene 1,5-diisocyanate. Preferred diisocyanates include 1,6-hexamethylene diisocyanate, isophorone diisocyanate, dicyclohexylmethane diisocyanate, mixtures of isomers of diphenylmethane diisocyanate with a 4,4'-diphenylmethane diisocyanate content greater than 96% by weight, and 4,4'-diphenylmethane diisocyanate and naphthalene 1,5-diisocyanate in particular.

Up to 15% by weight of the diisocyanates may be replaced by polyisocyanate; care must be taken to avoid the formation excessive crosslinking in the resulting product. Examples of such optional polyisocyanates include triphenylmethane 4,4',4"-triisocyanate and polyphenyl-polymethylene polyisocyanates.

Components B) are linear polyols with terminating hydroxyl groups and a number average molecular weight of 500 to 5000. Since they may contain a small percentage of branched polyols as impurities, they are often referred to as "substantially linear polyols". Preferred examples of polyols (B) include polyester diols, polyether diols (polyetherols), polycarbonate diols and mixtures thereof.

Examples of suitable polyether diols include those prepared by the reaction of one or more alkylene oxides containing 2 to 4 carbon atoms in their alkyl radical with a starter molecule which contains two active hydrogen atoms. Examples of suitable alkylene oxides include: ethylene oxide, 1,2-propylene oxide, epichlorohydrin and 1,2- and 2,-3-butylene oxide. Ethylene oxide, propylene oxide and mixtures of 1,2-propylene. oxide and ethylene oxide are preferably used. The alkylene oxides may be used individually, alternately in succession, or as mixtures. Examples of suitable starter molecules include: water, amino alcohols such as N-alkyl diethanolamines, for example N-methyl diethanolamine, and diols such as ethylene glycol, 1,3-propylene glycol, 1,4-butanediol and 1,6-hexane-diol. Mixtures of starter molecules may also optionally be used. Other suitable polyether diols are the polymerization products of tetrahydrofuran, which contain hydroxyl groups. The polyether diols may be used either individually or as mixtures of two or more polyetherols.

Trifunctional polyethers may optionally be used, in amounts of 0 to 30%, relative to the weight of the bifunctional polyetherols.

Examples of suitable polyester diols include those prepared, for example, from dicarboxylic acids containing 2 to 12 carbon atoms, preferably 4 to 6 carbon atoms, and polyhydric alcohols. Examples of suitable dicarboxylic acids include: aliphatic dicarboxylic acid such as succinic acid, glutaric acid, adipic acid, suberic acid, azelaic acid and sebacic acid, and aromatic dicarboxylic acids such as phthalic acid, isophthalic acid and terephthalic acid. The dicarboxylic acids may be used individually or as mixtures. e.g. in the form of a mixture of succinic, glutaric and adipic acids. In order to prepare the polyester diols it is possible to use the corresponding carboxylic acid derivatives instead of carboxylic acids, such as carboxylic acid esters containing 1 to 4 carbon atoms in their alcohol radical, carboxylic acid anhydrides, or carboxylic acid chlorides. Examples of polyhydric alcohols include glycols containing 2 to 10, preferably 2 to 6, carbon atoms, such as ethylene glycol, diethylene glycol, 1,4-butanediol, 1,5-pentanediol, 1,6-hexanediol, 1,10-decanediol, 2,2-dimethyl-1,3-propanediol, 1,3-propanediol and dipropylene glycol. The polyhydric alcohols may be used singly or as mixtures or two or more.

Esters of the carboxylic acid with the said diols are also suitable, particularly those containing 4 to 6 carbon atoms, such as 1,4-butanediol and/or 1,6-hexanediol, condensation products of ω-hydroxycarboxylic acids, for example ω-hydroxycaproic acid, and preferably polymerization products of lactones, for example ω-caprolactones which may optionally be substituted.

Ethanediol polyadipates, 1,4-butanediol polyadipates, ethanediol-1,4-butanediol polyadipates, 1,6-hexanediol-neopentyl glycol polyadipates, 1,6-hexanediol-1,4-butanediol polyadipates and polycaprolactones are preferably used as the polyester diols.

The polyester diols have molecular weights (number average) of 500 to 5000.

Chain extenders C) with molecular weights of 60 to 500 include aliphatic diols containing 2 to 14 carbon atoms, such as ethanediol, 1,6-hexanediol, diethylene glycol, dipropylene glycol, and 1,4-butanediol in particular, for example. However, diesters of terephthalic acid with glycols containing 2 to 4 carbon atoms are also suitable, such as terephthalic acid-bis-ethylene glycol or -1,4-butanediol for example, or hydroxyalkyl ethers of hydroquinone, such as 1,4-di-(β-hydroxyethyl)-hydroquinone for example, or (cyclo) aliphatic diamines, such as isophorone diamine, 1,2- and 1,3-propylenediamine, N-methylpropylenediamine-1,3 or N,N'-dimethyl-ethylenediamine, for example, and aromatic diamines, such as toluene 2,4- and 2,6-diamines, 3,5-diethyltoluene 2,4- and/or 2,6-diamine, and primary ortho-, di-, tri- and/or tetraalkyl-substituted 4,4'-diaminodiphenylmethanes, for example. Mixtures of the aforementioned chain extenders may also be used. Optionally, triol chain extenders having a molecular weight of 60 to 500 may also be used.

In order to prepare the TPUs, the components are reacted, optionally in the presence of catalysts, auxiliary agents and/or additives, in amounts such that the equivalent ratio of NCO groups to the sum of the groups which react with NCO, particularly the OH or $NH_2$ groups of the low molecular weight chain extenders and polyols, is 0.9:1.0 to 1.2:1.0, preferably 0.95:1.0 to 1.10:1.0.

Suitable catalysts for speeding up the formation of TPU include the usual tertiary amines which are known for this purpose, such as triethylamine, dimethyl-cyclohexylamine, N-methylmorpholine, N,N'-dimethyl-piperazine, 2-(dimethyl-aminoethoxy)-ethanol, diazabicyclo-(2,2,2)-octane and the like, for example, as well as organic metal compounds in particular, such as titanic acid esters, iron compounds, tin compounds e.g. tin diacetate, tin dioctoate, tin dilaurate or the dialkyltin salts of aliphatic carboxylic acids such as dibutyltin diacetate, dibutyltin dilaurate and the like. The preferred catalysts are organic metal compounds, particularly titanic acid esters and iron and/or tin compounds.

Apart from catalysts, auxiliary agents and/or additives may be incorporated in the TPU components. Examples which should be mentioned include internal lubricants, anti-seizing agents, inhibitors, stabilizers against hydrolysis, light, heat and discoloration, flame retardants, colorants, pigments, inorganic and/or organic fillers and reinforcing agents.

Reinforcing agents include fibrous materials such as inorganic fibers which are well known in the prior art and which may optionally be sized in a manner well known in the art.

More detailed information on the aforementioned auxiliary agents and additives may be found in the technical literature, for example in the monograph "High Polymers" by J. H. Saunders and K. C. Frisch, Volume XVI, Polyurethanes, Parts 1 and 2, Interscience Publishers 1962 and 1964, respectively, or in DE-OS 2,901,774.

A wide variety of previously produced (co)polymers may be used as I) in the process according to the invention. Other, previously produced thermoplastic polyurethanes may also be used.

Thermoplastic copolymers which are suitable according to the invention include the known ABS plastics. These are elastic-thermoplastic two-phase plastics which are essentially synthesized from acrylonitrile (A), butadiene (B) and styrene or α-methylstyrene (S). B may be completely or partially replaced by another rubber component, e.g. by an EPDM rubber (a so-called AES polymer). These polymers contain a continuous phase comprising a thermoplastic resin (e.g. styrene/acrylonitrile copolymer, SAN) and a discontinuous rubber phase comprising small rubber particles, which are mostly present as a graft polymer of styrene and acrylonitrile on the rubber. They are produced in the known manner by emulsion, suspension, bulk and solution polymerization or by combinations of these methods (see C. H. Basdekis in "ABS Plastics", Reinhold Publishing Corporation, New York, 1964).

Polymers which are also suitable comprise polyethylene and polypropylene, copolymers of ethylene and other olefinically unsaturated monomers, polybutene-(1), polymethylpentene, polystyrene (particularly high-impact polystyrene), polyvinyl chloride, methyl polymethacrylate, polycarbonates, polyamides, aromatic polyethers (e.g. polyphenylene oxide), polyesters of terephthalic acid and optionally isophthalic acid, and butylene glycol and/or ethylene glycol, polybutylene glycol terephthalate containing soft polyether segments, cellulose esters (e.g. cellulose acetate, propionate and acetobutyrate), styrene-butadiene (graft)-copolymers (optionally in admixture with other polymers), and also polypropylene and ethylene-propylene copolymers in admixture with EPM and/or EPDM rubbers, or ethylene/vinyl acetate copolymers. Polymers of this type are described by Vieweg et al. in the Kunststoff-Handbuch [*Plastics Handbook*], Volumes II–VII, IX and XI, Carl-Hanser-Verlag, Munich, 1963 to 1992, and by Hansjürgen S achtling in the "Kunst-stofffaschenbuch" [*Plastics Pocket Book*], 21st Edition, Carl-Hanser-Verlag, Munich-Vienna, 1979.

ABS polymers which are preferred according to the invention are mixtures of a) 5 to 70% by weight of one or more graft products and b) 95 to 30% by weight of one or more thermoplastic resins.

Graft products a) are preferably polymers which are obtained by the polymerization of graft monomers in the presence of a rubber as the graft base. The rubber content in this respect is 5 to 80% by weight and is jointly determined by the polymerization process. The rubber is present in the form of discrete particles, but forms a discontinuous phase.

Polybutadiene, butadiene/acrylonitrile and butadiene/styrene polymers, as well as butadiene-styrene block polymers, are particularly suitable as the graft base. The principal graft monomers are styrene, mixtures of styrene and acrylonitrile, preferably in a weight ratio of 90:10 to 50:50, a mixture of styrene and methyl methacrylate, preferably in a weight ratio of 5:95 to 95:5, and styrene-acrylonitrile-methyl methacrylate mixtures.

The thermoplastic resin b) forms the continuous phase (matrix), and is, for example, a polymer or copolymer of styrene, α-methylstyrene, acrylonitrile, methyl methacrylate and maleic anhydride. Polystyrene, a styrene-acrylonitrile copolymer with an acrylonitrile content of 20 to 35% by weight, and α-methylstyrene-acrylonitrile copolymers with an acrylonitrile content of 21 to 31% by weight are preferred. The weight average molecular weight of these resins is generally 50,000 to 550,000. The molecular non-uniformity, expressed as the value $(M_w/M_N)-1=U_n$, is 1.0 to 3.5.

Component a) may be used according to the invention on its own as component I).

The thermoplastic (co)polymer, component I) in accordance with the invention, is employed in an amount of 1 to 60% by weight, preferably 3 to 25% by weight, with respect to the TPU/polymer mixture.

The flow enhancers which are mixed into copolymer I) are products which substantially improve the melting and flow behavior of the thermoplastic (co)polymer, i.e. which raise the MVR value, measured according to ISO 11 33, by at least 3.

Examples include commercially available internal lubricants, such as stearyl amides, stearyl adipates, fatty acids, calcium stearates, paraffins or fluoropolymers and commercially available plasticisers such as phthalates, phosphates, adipates, trimellitic acid esters, dicarboxylic acid esters, hydroxycarboxylic acid esters, polyesters, polyethers or alkyl-sulphonic acid esters of phenol. Additives of these two types are described, for example, in R. Gächter/H. Müller (Ed.): Taschenbuch der Kunststoff-Additive [*Handbook of Plastics Additives*], 3rd Edition, Carl-Hanser-Verlag, Munich, 1989. Alcohols such as ethylene glycol, glycerine, and butane- and hexanediols, and diisocyanates such as diphenylmethane 1,4-diisocyanate, are also suitable.

Preferably polyols with a number average molecular weight of 500 to 5000 which also form part of component B) for the formation of polyurethane are used as flow enhancers. Particularly preferred are polyester diols with a number average molecular weight of 800 to 4000.

The flow enhancer is used in an amount of 1 to 30% by weight, preferably 2 to 20% by weight, with respect to the thermoplastic (co)polymer I).

The process according to the invention is carried out as follows:

The flow enhancer is mixed into the thermoplastic (co) polymer I) batch-wise or continuously by known methods. A rapid mixer, a kneader or an extruder may be used for this purpose, for example. It may also be sufficient to add the flow enhancer to (co)polymer I).

In one particular embodiment of the invention, the flow enhancer is continuously mixed with the (co)polymer in an extruder (side screw) and is metered directly into the reaction extruder in which the TPU is produced.

The first portion of the TPU reaction extruder may also be used for mixing.

The TPUs are continuously produced during the so-called extruder process, i.e. in a multi-shaft extruder, in the presence of the (co)polymer-flow enhancer mixture. The TPU components A), B), and C) may be added simultaneously ("one shot") or in succession ("prepolymer method"). In this respect, the prepolymer may be produced batch-wise or continuously in part of the reaction extruder, or in a separate reactor disposed upstream.

The (co)polymer-flow enhancer mixture is preferably metered into the first feed point of the extruder together with part or the total amount of a TPU component A), B) or C). The components which are lacking in each case are then added singly or pre-mixed in one or more feed points downstream in the extruder.

The (co)polymer is most preferably pre-mixed in the first section of the extruder with part of polyol B) as a flow enhancer. Part or the total amount of diisocyanate A) or part or the total amount of diol C) is likewise added to the first section. The respective residual amounts of TPU components are metered into one or more subsequent, down stream feed-points.

The thermoplastic molding compositions of the invention, containing TPU/(co)polymer mixtures may be processed particularly easily due to their outstanding melting behavior. They have good mechanical and elastic properties and a significantly improved impact strength with a high degree of rigidity, particularly at low temperatures. They are thus preferably used for the production of highly-stressed injection molded articles, such as automobile parts and ski boots.

The invention is further illustrated but is not intended to be limited by the following examples in which all parts and percentages are by weight unless otherwise specified.

EXAMPLES

Example 1

Pre-mixing of ABS and Polyester Diol 34 parts by weight of a commercially available emulsion ABS comprising 17 wt.-% acrylonitrile, 53 wt.-% styrene and 30 wt-% butadiene were compounded with 3.4 parts by weight of a poly-1,4-butanediol adipate with a molecular weight (number average) of about 2250 in a twin-shaft kneader (Werner-Pfleiderer ZSK 53).

The temperature of the 12 sections was 220° C., and the rotational speed of the ZSK was set to 300 rpm. The total throughput rate was 80 kg/hour.

The extrudate was cooled in water, granulated and dried (110° C./2 hours).

TPU Reaction

The TPU reaction was effected continuously in a Werner-Pfleiderer ZSK 120 twin-shaft screw extruder. The temperatures of the 13 sections were 160° C. to 220° C. The rotational speed of the screw was set to 300 rpm.

The ABS/polyester diol mixture prepared as above was metered into the first section of the extruder together with 1.5 parts by weight of ethylene bis(stearyl amide). 114 parts by weight of diphenylmethane diisocyanate (liquid MDI, 50° C.) were added to the same section. A mixture, at 190° C., of 96.6 parts by weight of poly-1,4-butanediol adipate (number average molecular weight about 2250), 1.0 parts by weight of 2,2'-6,6'-tetraisopropyl diphenyl carbodiimide, 1.75 parts by weight of hexanediol and 10 ppm of tetrabutyl titanate, was metered into the third section together with 35 parts by weight of butanediol. The total amount metered in was 1200 kg/hour.

The extrudate was cooled in water and granulated.

EXAMPLE 2

The procedure was as in Example 1, except that poly-1,4-butanediol adipate (number average molecular weight about 900) was used instead of poly-1,4-butanediol adipate (number molecular weight about 2250) for pre-mixing with the ABS.

EXAMPLE 3 (COMPARATIVE EXAMPLE)

The procedure was as in Example 1, except that pre-mixing of the ABS with poly-1,4-butanediol adipate (number average molecular weight about 2250) was omitted. The ABS was added to the reaction on its own, and the 3.4 parts by weight of polyester diol were introduced in addition into the polyester diol mixture of the TPU reaction, so that 100.0 parts by weight of poly-1,4-butanediol adipate were then metered in there, instead of 96.6 parts by weight.

The most important properties of the products produced in the examples are summarized in Table 1.

It can clearly be seen that the melting temperatures of the copolymer were significantly decreased by the use of a flow enhancer in the procedure according to the invention, compared with a standard process. This resulted in better dispersion of the copolymer in the TPU.

As a result, lower melting temperatures were obtained for the TPU-ABS mixture, with the melt processing range being broadened at the same time. Moreover, improved low temperature properties were obtained.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the continuous production of a thermoplastic molding composition comprising
   (a) introducing into an extruder
      I) 1 to 60%, with respect to the total weight of (I) and (II), of a (co)polymer, and
      II) 99 to 40%, with respect to the total weight of (I) and (II), of polyurethane-forming components including
         A) an organic diisocyanate
         B) a first linear polyol having terminal hydroxyl groups and a number average molecular weight of 500 to 5000, and
         C) a chain extender having a molecular weight of 60 to 500, and upon completing the formation of said polyurethane,
   (b) discharging the resulting mixture from the extruder, wherein said (I) contains 1 to 30%, relative to its weight, of a flow enhancer and where the molar ratio of the NCO groups in A) to the groups which react with NCO in B) and C) is 0.9 to 1.2 and wherein said extruder is operating under time and temperature conditions sufficient to bring about the formation of thermoplastic polyurethane and the mixing of said thermoplastic polyurethane with said (co)polymer and wherein said flow enhancer is a second linear polyol having terminal hydroxyl groups and a number average molecular weight of 500 to 5000.

2. The process of claim 1 wherein said (co)polymer is ABS.

3. The process of claim 2 wherein said ABS is present in an amount of 3 to 25%.

4. The process of claim 1 wherein said flow enhancer is a polyester diol having a number average molecular weight of 800 to 4000.

TABLE 1

| | ABS MVR ISO 1133 | | | Hardness DIN 53505 | TPU-ABS MVR ISO 1133 | | | | Impact tension (−20° C.)DIN 53488 Elongation | Breaking stress DIN 53504 |
|---|---|---|---|---|---|---|---|---|---|---|
| Ex. | 190° C. | 200° C. | 210° C. | Shore D | 205° C. | 210° C. | 215° C. | 220° C. | % | MPa |
| 1 | 30.8 | 51.0 | 80.8 | 59 | 3.4 | 21.3 | 47.4 | 92 | 36 | 58.8 |
| 2 | 34.5 | 56.0 | 90.3 | 58 | 4.5 | 23.1 | 46.2 | 93 | 45 | 63.8 |
| 3 | 2.3 | 4.7 | 8.8 | 59 | n.m. | 17.1 | 59.3 | 148 | 29 | 57.2 | n.m. = not determined